United States Patent
Lanphear

(10) Patent No.: US 11,827,262 B2
(45) Date of Patent: Nov. 28, 2023

(54) ADJUSTABLE HEIGHT MULTI SHELF CART

(71) Applicant: John Stephen Lanphear, Lawrence, MI (US)

(72) Inventor: John Stephen Lanphear, Lawrence, MI (US)

( * ) Notice: Subject to any disclaimer, the term of this patent is extended or adjusted under 35 U.S.C. 154(b) by 158 days.

(21) Appl. No.: 17/162,786

(22) Filed: Jan. 29, 2021

(65) Prior Publication Data

US 2021/0237788 A1   Aug. 5, 2021

Related U.S. Application Data

(60) Provisional application No. 62/968,151, filed on Jan. 31, 2020.

(51) Int. Cl.
*B62B 3/02* (2006.01)
*B62B 3/00* (2006.01)
(Continued)

(52) U.S. Cl.
CPC .............. *B62B 3/02* (2013.01); *B60R 16/033* (2013.01); *B62B 3/001* (2013.01); *B62B 3/04* (2013.01); *B62B 2206/06* (2013.01)

(58) Field of Classification Search
CPC .......... B62B 5/0009; B62B 1/12; B62B 3/02; B62B 2206/06; B62B 2206/003; B62B 3/005; B62B 3/006
See application file for complete search history.

(56) References Cited

U.S. PATENT DOCUMENTS

| 6,343,556 B1 | 2/2002 | Lanphear |
| 6,874,432 B2 | 4/2005 | Lanphear |

(Continued)

FOREIGN PATENT DOCUMENTS

| CN | 203713928 | 7/2014 |
| CN | 203819292 | 9/2014 |

(Continued)

OTHER PUBLICATIONS

Freezer (https://cdn.shopify.com/s/files/1/0478/4580/2152/files/VB_SPec.pdf?v=1620399272) (Year: 2017).*

(Continued)

*Primary Examiner* — James A Shriver, II
*Assistant Examiner* — Nicholas R. Kandas
(74) *Attorney, Agent, or Firm* — Diederiks & Whitelaw, PLC.

(57) ABSTRACT

An adjustable height cart height adjustable cart includes a frame extending in a longitudinal direction from a front end of the cart to a rear end of the cart. The frame includes a base provided with casters and a height adjustable frame connected to the base. The height adjustable frame is configured to be raised or lowered relative to the base. The height adjustable frame includes a lower shelf and an upper shelf. The upper shelf has an opening for loading and unloading items onto the cart. A handle is connected to the base at the rear end. A lower tote is slidably mounted on the lower shelf so as to move in a lateral direction. A top tote is slidably mounted on the upper shelf so as to move in the longitudinal direction forward and backward to enable loading of the lower tote through the opening.

20 Claims, 4 Drawing Sheets

(51) Int. Cl.
    *B62B 3/04*     (2006.01)
    *B60R 16/033*     (2006.01)

(56) References Cited

U.S. PATENT DOCUMENTS

| | | | | |
|---|---|---|---|---|
| 8,065,966 | B1* | 11/2011 | Bacon et al. | A47B 9/16 |
| 8,925,683 | B1* | 1/2015 | Gunsaullus | E06C 1/38 |
| 10,118,632 | B2 | 11/2018 | Carzola | |
| 2009/0194496 | A1* | 8/2009 | Dressendorfe | |
| 2011/0133417 | A1 | 6/2011 | Rouillard et al. | |
| 2012/0007323 | A1* | 1/2012 | Janick et al. | B62B 3/008 |
| 2014/0218282 | A1* | 8/2014 | Hung | B62B 3/02 |
| 2017/0356593 | A1* | 12/2017 | Churchvara et al. | B62B 3/005 |
| 2020/0039551 | A1 | 2/2020 | Seagraves et al. | |
| 2021/0318724 | A1* | 10/2021 | Sung et al. | B62B 3/02 |

FOREIGN PATENT DOCUMENTS

| | | |
|---|---|---|
| CN | 204355104 | 5/2015 |
| CN | 107512297 | 12/2017 |
| CN | 108099980 | 6/2018 |
| CN | 207535933 | 6/2018 |
| CN | 108839685 | 11/2018 |
| DE | 10201301291 | 5/2003 |
| DE | 10307394 | 10/2003 |
| KR | 200338554 | 1/2004 |
| KR | 101575195 | 12/2015 |
| WO | 2019228647 | 12/2019 |
| WO | 202089413 | 5/2020 |

OTHER PUBLICATIONS https://www.newcastlesys.com/our-solutions/powerpick-station-specifications Retrieved Nov. 23, 2020.

https://www.pickingsolutions.com/ladder-carts Retrieved Nov. 23, 2020.

* cited by examiner

ADJUSTABLE HEIGHT MULTI SHELF CART

CROSS REFERENCE TO RELATED APPLICATIONS

This application claims benefit of U.S. Provisional patent Application No. 62/968,151 which was filed on Jan. 31, 2020 and titled "ADJUSTABLE HEIGHT MULTI SHELF CART". The entire content of this application is incorporated herein by reference.

BACKGROUND OF THE INVENTION

The present invention relates to adjustable height multi shelf carts, and, more particularly, to a cart that has an adjustable height and that can be easily loaded and unloaded.

Recently there has become a need to have a portable and easily adjustable cart which can vary its height. Portable, height-adjustable carts are used in a variety of fields. For example, such carts can be used in offices, restaurants, factories and machine shops. Exemplary carts are illustrated in U.S. Pat. Nos. 6,343,556; 6,874,432; and 10,118,632, which are incorporated by reference. The portable nature of these carts allows them to be moved wherever they are needed.

More recently such carts have been used in an order fulfillment model, which is sometimes referred to as a pick to cart model, where operators move around a warehouse and pick items off of shelves in the warehouse and place them on the cart. The cart is then transported to a place where the items are moved from the cart to a fixed height conveyor and then moved to where the items are packaged for shipping and delivery to end customers.

By changing their height, the carts can be adapted to different tasks and users. For example, in order to carry additional items, carts are often provided with multiple shelves. However, having multiple shelves on a cart can also pose problems if the carts are used with non-height-adjustable structures, such as shelves, other tables, or fixed height conveyors which may be located in the warehouse. Therefore, there is a need in the art for a height-adjustable cart with shelves that can be conveniently used to assist people in picking parts from a location and putting them on the shelves of the cart. Further there is a need for unloading multiple items onto a conveyer, which may not be at the same height as the shelves on the cart.

For the reasons discussed below, the cart must be stable and, in addition, be able to unload multiple items from different height shelves onto a conveyor. Accordingly, it is desirable to provide adjustable height multi-shelf carts which do not suffer the drawbacks mentioned above and furthermore is easily adjustable in height, readily loaded and unloaded.

SUMMARY OF THE INVENTION

This invention is directed to an adjustable height cart. The cart includes a frame extending in a longitudinal direction from a front end of the cart to a rear end of the cart. The frame includes a base provided with casters and a height adjustable frame connected to the base. The height adjustable frame is configured to be raised or lowered relative to the base. The height adjustable frame includes a lower shelf and an upper shelf. The upper shelf has an opening for loading and unloading items onto the lower shelf of the cart. A handle is connected to the base at the rear end of the cart. A lower tote is slidably mounted on the lower shelf so as to move in a lateral direction. A top tote is slidably mounted on the upper shelf so as to move in the longitudinal direction forward and backward to enable loading of the lower tote through the opening.

The bottom tote is configured to be pushed off of the bottom shelf and the upper tote is configured to be pushed off of the upper shelf. The upper shelf includes bent end stops and angled side edges configured to retain the top tote. The frame is configured to allow the lower tote to slide laterally and also optionally configured with a detent to retain the lower tote in a center position. The upper and lower totes each have side walls with openings formed in the shape of handles configured to allow the upper tote to be moved longitudinally and the lower tote to be pulled laterally.

The base is preferably in the shape of an H and has two upright posts. The cart further comprises an adjustable height mechanism mounted on or in one of the posts extending between the base and the height adjustable frame. The cart includes a battery. The height adjustable mechanism is preferably an electric screw drive actuator powered by the battery. A pinch guard is also provided to protect a user of the cart from the height adjustable mechanism. The base preferably has four casters and a centrally located fixed direction wheel configured to allow the cart to make turns. The cart has folding steps that include a bar linkage system and a foot member that acts as a pedal which is pushed to lower the stairs and acts as a foundation contacting the floor when the steps are lowered into a deployed position. A pneumatically driven actuator biases the stairs into a stowed position.

The cart also includes a controller for the height adjustable mechanism and a hand switch or buttons for the controller. The hand switch allows the operator to raise and lower the upper shelf. The frame is formed with an inverted U-shape support for the controller, the hand switch and the lift mechanism. The frame also includes a mount for accessories such as a tablet holder, a bottle holder, a battery level meter and the hand switch.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENTS

Figure 1:
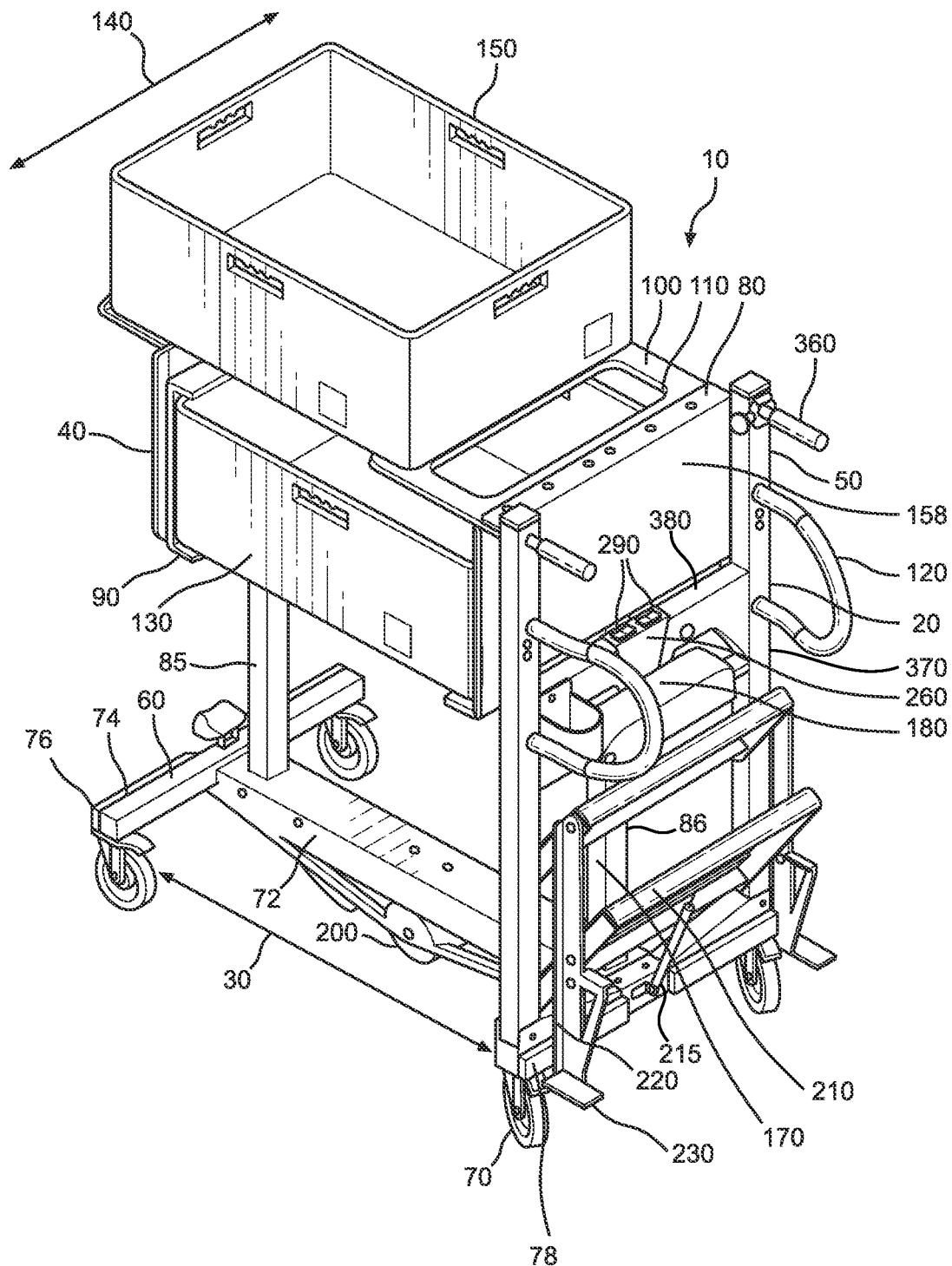
FIG. 1 is a perspective back view of an overall cart with upper and lower shelves for supporting totes shown in a raised position and with steps also shown in the raised position.

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

In addition, any specific numerical value listed includes a margin of error of +/−5%. Accordingly, a length of 100 cm includes lengths between 95 and 105 cm. Similarly, the terms "horizontal", "vertical", "parallel" and "perpendicular" are defined as including a margin of error of 5° such that an object need not be perfectly horizontal, for example. The term "approximately" increases these various margins to 10% and 10°.

With initial reference to FIG. 1, there is shown an adjustable height cart 10 having a frame 20 that extends in a longitudinal direction 30. Frame 20 has a front end 40 and rear end 50. Preferably frame 20 is made of aluminum so that a light weight welded aluminum frame is formed. However, frame 20 can also be made of other materials such as steel or plastic. Also frame 20 is preferably constituted by hollow tubes that allow for additional strength without extra weight. While frame 20 is shown made up of tubes with a hollow square in cross section, frame 20 could be formed with other shapes such as I-beams or hollow circular pipes.

Frame 20 is made up of a base 60 which is provided with casters 70 to allow cart 10 to be easily moved and turned by an operator. Base 20 is preferably in the shape of an H and includes a center member 72 that extends in longitudinal direction 30. A cross member 74 is located at front end 40 and has two of casters 70 located at each end. One or more bumpers 76 are mounted on cross member 74. Bumpers 76 are preferably made of urethane or another type of resilient rubber or similar material. Likewise, another cross member 78 is located at rear end 50 and also has two of casters 70 located at each end. While center member 72 and cross members 74, 76 are preferably welded together, members 72, 74, 76 of frame 20 could be connected together with fasteners such as screws or bolts. By locating casters 70 at the ends of cross members 74, 78, cart 10 becomes more stable. Casters 70 are preferably 5-inch diameter casters that are capable of swiveling.

Figure 2:
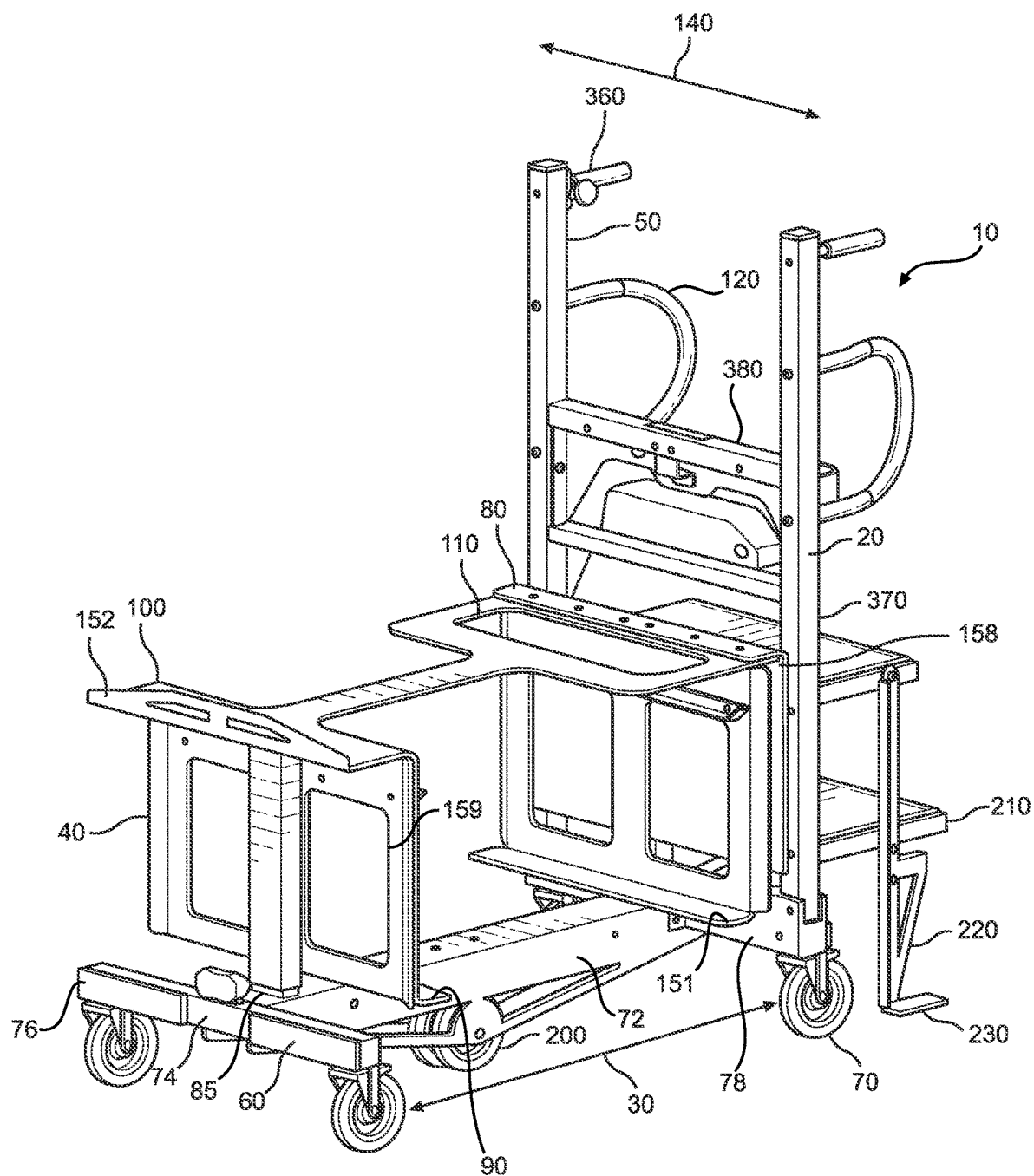
FIG. 2 is a perspective front view of the cart with the shelves in a lowered position, the totes removed for clarity, and the stairs in the lowered deployed position.
Figure 3:
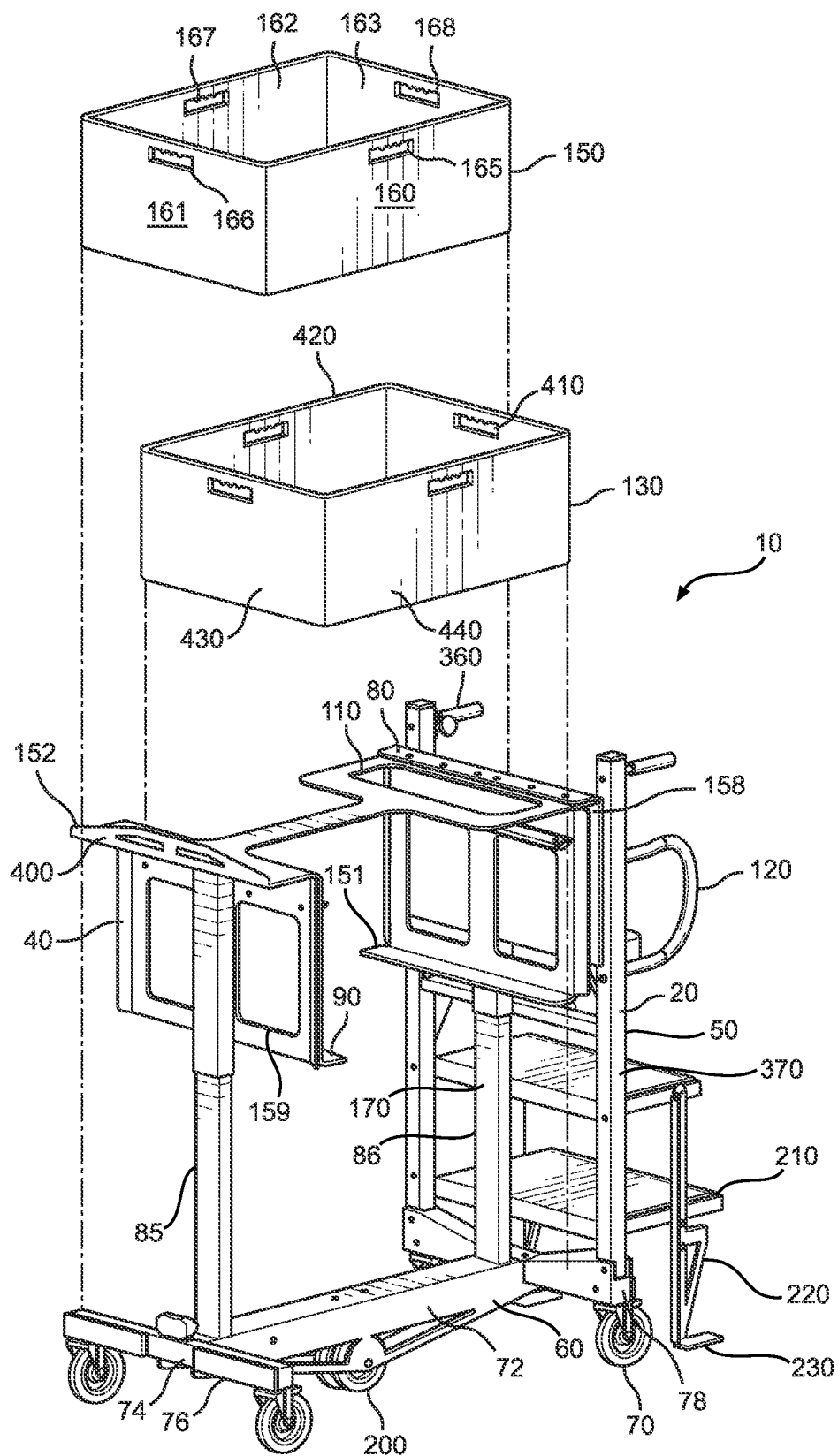
FIG. 3 is a vertically exploded view of the cart of FIG. 2

Turning now to FIGS. 2 and 3, frame 20 also has a height adjustable frame 80 that has a lower shelf 90 and an upper shelf 100. Cart 10 contains at least one shelf, but could have multiple shelves. Height adjustable frame 80 is mounted on two supports 85, 86 extending upwardly from base 60. Supports 85, 86 are preferably telescoping and therefore extendable. Frame 80 may be placed in a lower position as shown in FIG. 2 or a raised position as shown in FIG. 3. Upper shelf 100 is provided with an opening 110 which allows an operator to access items stored on lower shelf 90. A handle 120 is provided on cart 10 to allow the operator to move cart 10 from place to place.

Referring back to FIG. 1, a lower tote 130 is slidably mounted on lower shelf 90 such that tote 130 can be slid in a lateral direction 140. A top tote 150 is provided on upper shelf 100 and is mounted so as to slide in in longitudinal direction 30.

Figure 4:
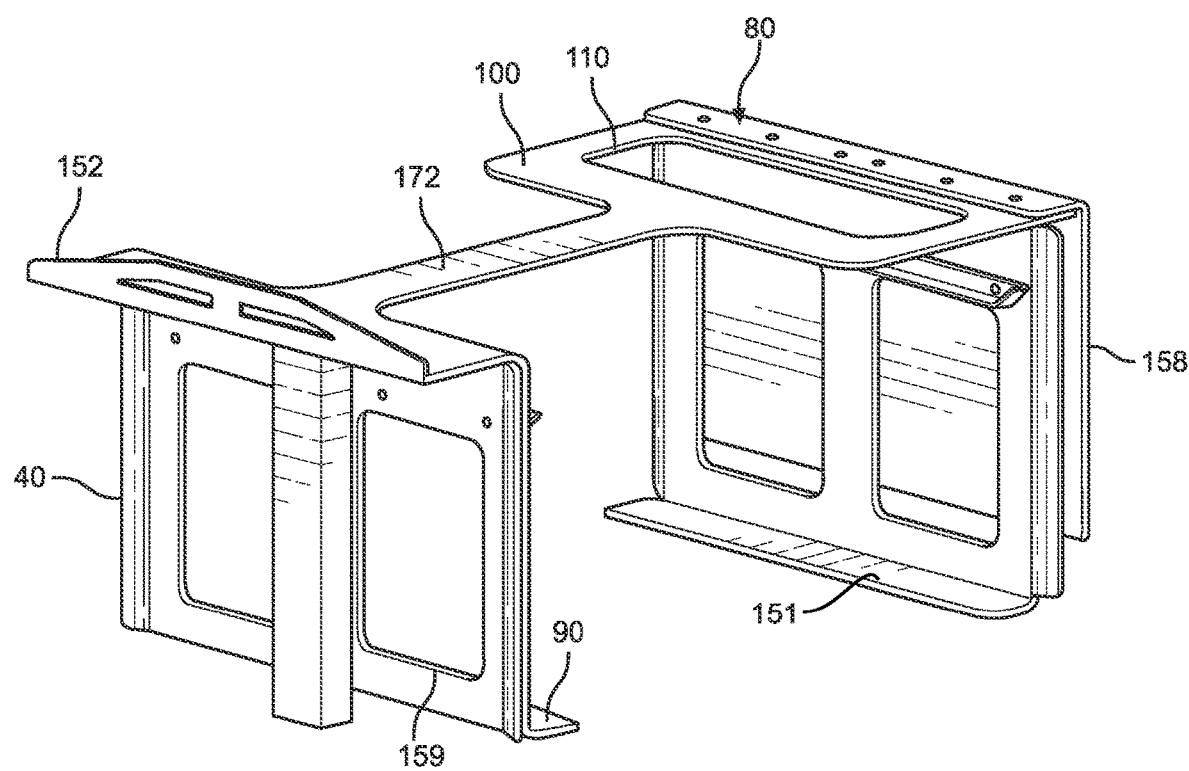
FIG. 4 is a perspective view of just upper and lower shelves separated from the cart of FIG. 1.

As best seen in FIGS. 2 and 4, guides 151 are provided on lower shelf 90 to guide tote 130. Upper shelf 100 preferably has incorporated into it bent end stop(s) 152 and optionally is provided with angled side edges (not shown) bent up preferably on a 45 degree angle, that help tote 150 remain on shelf 100. Shelf 100 also can have a downward bent end 158 that acts as an anti-pinch/shear guard to protect the operator. Upper shelf 100 and lower shelf 90 can have cutouts 159 to lighten their weight. Upper shelf 100 includes a flat center portion 172 extending between opening 110 and end stop 152. While only two shelves 90, 100 are shown, additional shelves could be employed to a carry more items. If cart 10 has more than one shelf, top shelf 100 preferably is longer than lower shelf 90 and has a cutout opening 110 so an operator can place items through opening 110 in top 100 shelf into the bottom tote 130.

As best seen in FIG. 3, sides 160-163 of upper tote 150 are formed with handles 165-168 to grab to assist in pulling tote 150. Tote 130 also has four sides 410, 420, 430, 440 which also have handles, not separately labelled.

An adjustable height mechanism 170 is mounted between base 20 and height adjustable frame 80 and is preferably formed inside telescoping support 86, but could also be mounted next to support 86. A battery 180 is mounted to base 80 and is arranged to provide power to adjustable height mechanism 170. Battery 180 is preferably a 24 volt 2.2 amp hour lithium-ion battery, but other power sources could be employed. Preferably, adjustable height mechanism 170 is an electric screw drive linear actuator and is mounted to move lower and upper shelfs, 90, 100 up or down as required by an operator. Adjustable height mechanism 170 is preferably powered by battery 180 so as to maintain adjustability while pushing cart 10. Pinch guard 158 is at least as long as the vertical travel of lift actuators 170.

In addition to casters 70, base 60 is provided with a center fixed direction wheel 200 to further aid in turning cart 10.

Cart 10 would preferably have four casters 70, one on each corner, and a center fixed direction wheel 200 or wheels to easily make turns. Frame 20 incorporates the features to mount the center wheel 200, controller for the lift system, the lift actuators 170.

The cart also preferably has folding steps that allow the operator to easily reach taller items on racks. At rear end 50 of cart 10 there is mounted a set of folding steps 210 that may be moved from a deployed position (FIGS. 2 and 3) wherein steps 210 rest on the ground and a stowed position wherein steps 210 fold upward against cart 10 (FIG. 1). Preferably a pneumatic actuator 215 such as a gas strut is provided between cart 10 and steps 210 to bias steps 210 toward the stowed position (FIG. 1). Link bars 220 are provided to allow for a smooth transition between the stowed and deployed positions. Link bars 220 also preferably have a lower bent "foot" 230 that acts as both a solid foundation for contacting the floor, but also is used to easily press on with a foot to lower the steps 210 to the floor. Steps 210 are provided with tread tape (not shown) to provide better traction for the operator.

A controller 260 is provided with a hand switch 290 with buttons to allow the operator to raise and lower frame 80 and upper shelf 100 by turning on adjustable height mechanism 170. Preferably, the height would be adjusted by pressing an electric button 290 that would activate the electric lift system 170. There are additional handles 360 for pushing cart 10, that are fixed to frame members 370 that rise up from lower crossbar 78. Vertical frame members 370 are connected at the bottom by lower crossbar 78, and at some point near the top by a frame member 380 that serves as a mount for hand switch 290, guard panel, and, bottle holder, battery level meter, etc., not separately labeled.

In operation, once the operator has put parts onto totes 130, 150 of cart 10, the operator can easily move shelves 90, 100 up and down according to their needs. One of such need would be using totes 130, 150 on each shelf, and having to push cart 10 over to a conveyor that is at a fixed height and the operator needs to push each of the two totes 130, 150 off onto the conveyor not shown. The operator would raise top tote 150 to the conveyor height and push top tote 150 off of upper shelf 100, and then raise lower shelf 90 to the conveyor height and push bottom tote 130 off onto the conveyor.

As can be seen from the above description the invention provides a cart that can assist people in picking parts from a location and putting them on the shelves, either in totes 130, 150 or directly on the shelves 90, 100.

Although described with reference to preferred embodiments, it should be readily understood that various changes or modifications could be made to the invention without departing from the spirit thereof. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. In general, the invention is only intended to be limited by the scope of the following claims.

I claim:

1. A height adjustable cart comprising:
    a frame extending in a longitudinal direction from a front end of the cart to a rear end of the cart, the frame including a base provided with casters and a height adjustable frame connected to the base and being configured to be raised or lowered relative to the base; said height adjustable frame including a lower shelf with a support surface and an upper retaining element and an upper shelf having an opening;
    a handle connected to the base at the rear end;
    a lower tote slidably mounted on the lower shelf between the support surface and upper retaining element so as to move in a lateral direction; and
    a top tote slidably mounted on the upper shelf so as to move in the longitudinal direction forward and backward to enable loading of the lower tote through the opening.

2. The cart according to claim 1 wherein the base is in a shape of an H.

3. The cart according to claim 1, further comprising an adjustable height mechanism extending between the base and the height adjustable frame.

4. The cart according to claim 3, further comprising a battery and wherein the height adjustable mechanism is an electric screw drive actuator powered by the battery.

5. The cart according to claim 1, wherein the base includes four casters and a center fixed direction wheel configured to allow the cart to make turns.

6. The cart according to claim 1, wherein the cart further comprises folding steps that include link bars and a pedal configured to be pushed to lower the steps and as a foundation contacting a floor when the steps are lowered.

7. The cart according to claim 3, further comprising a controller for the height adjustable mechanism and a hand switch for the controller wherein the frame is formed in an inverted U-shape and supports the controller, the hand switch and the height adjustable mechanism.

8. The cart according to claim 1, wherein the support surface and the upper retaining element are configured to keep the lower tote from tipping when the lower tote is pushed off the lower shelf and the upper tote is configured to be pushed off the upper shelf.

9. The cart according to claim 1, wherein the frame includes a mount for accessories including at least one of, a bottle holder, and a hand switch.

10. The cart according to claim 1, wherein the top shelf includes bent end stops configured to retain the top tote and a pinch guard.

11. The cart according to claim 1, wherein the lower shelf has an end stop mechanism preventing the lower shelf from completely separating from the frame.

12. A method of operating a height adjustable cart including a frame, extending in a longitudinal direction, having a base provided with casters and a height adjustable frame provided with a lower shelf and a lower tote slidably mounted on the lower shelf so as to move in a lateral direction and an upper shelf having an opening, said method comprising:
    sliding a lower tote on the lower shelf between a support surface and an upper retaining element;
    moving an upper tote on the upper shelf in the longitudinal direction to expose the opening; and
    loading the lower tote by placing items through the opening.

13. The method of claim 12 further comprising:
    lowering the height adjustable frame so that the upper shelf is at an unloading height;
    unloading the upper tote from the upper shelf;
    raising the height adjustable frame so that the lower shelf is at the unloading height; and
    unloading the lower tote.

14. The cart according to claim 1, wherein the upper shelf includes an extension positioned longitudinally beyond the frame.

15. A height adjustable cart comprising:
- a frame extending in a longitudinal direction from a front end of the cart to a rear end of the cart, the frame including a base provided with casters and a height adjustable frame connected to the base and being configured to be raised or lowered relative to the base; said height adjustable frame including a lower shelf and an upper shelf having an opening and an extension positioned longitudinally beyond the frame;
- a handle connected to the base at the rear end;
- a lower tote slidably mounted on the lower shelf so as to move in a lateral direction; and
- a top tote slidably mounted on the upper shelf so as to move in the longitudinal direction forward and backward to enable loading of the lower tote through the opening, wherein the extension includes bent end stops configured to retain the top tote.

16. The cart according to claim 1, wherein the top tote extends more than half a length of the top shelf.

17. The cart according to claim 1, wherein the upper shelf is a top shelf.

18. The cart according to claim 1, wherein the top tote having four sides that form a level top surface with no side access areas.

19. The cart according to claim 3, wherein the height adjustable mechanism is configured to:
- lower the height adjustable frame so that the upper shelf is at an unloading height; and
- raise the height adjustable frame so that the lower shelf is at the unloading height.

20. A height adjustable cart comprising:
- a frame extending in a longitudinal direction from a front end of the cart to a rear end of the cart, the frame including a base provided with casters and a height adjustable frame connected to the base and being configured to be raised or lowered relative to the base; said height adjustable frame including a lower shelf and an upper shelf having a support surface with a central opening;
- a handle connected to the base at the rear end;
- a lower tote slidably mounted on the lower shelf so as to move in a lateral direction, wherein, the support surface is shaped to have ends and a narrow central portion that is narrower in the latitudinal direction than the ends, forming a side opening to allow clearance for an operator while the operator pushes the lower tote off the lower shelf in the lateral direction; and
- a top tote slidably mounted on the upper shelf so as to move in the longitudinal direction forward and backward to enable loading of the lower tote through the central opening and through the side opening.

* * * * *